United States Patent [19]

Figge

[11] 4,348,442
[45] Sep. 7, 1982

[54] STRUCTURAL PANEL

[76] Inventor: Irving E. Figge, 2174 E. Pepperwood Dr., Sandy, Utah 84070

[21] Appl. No.: 256,630

[22] Filed: Apr. 22, 1981

Related U.S. Application Data

[63] Continuation-in-part of Ser. No. 172,674, Jul. 28, 1980, abandoned, which is a continuation of Ser. No. 45,918, Aug. 17, 1979, abandoned.

[51] Int. Cl.³ ............................................. B32B 3/30
[52] U.S. Cl. ........................................ 428/72; 428/76;
428/178; 428/179; 428/180; 428/183; 428/186;
108/56.1; 52/792
[58] Field of Search .................... 428/73, 72, 76, 120,
428/178, 180, 183, 184, 186, 116, 119; 52/792;
108/56.1; 24/213 B

[56] References Cited

U.S. PATENT DOCUMENTS 3,142,599  7/1964  Chavannes ...................... 428/180 X
3,642,566  2/1972  Figge ............................ 428/116 X
3,645,833  2/0972  Figge ................................ 428/107
3,657,059  4/1972  Figge ................................ 428/110
3,689,345  9/1972  Figge et al. ..................... 428/116 X
3,899,805  8/1975  McMillan ........................ 428/33 X

FOREIGN PATENT DOCUMENTS

498839  2/1951  Belgium ............................ 428/178

Primary Examiner—George F. Lesmes
Assistant Examiner—Alexander S. Thomas
Attorney, Agent, or Firm—Fidelman, Wolffe & Waldron

[57] ABSTRACT

A structural panel comprises truncated polyhedral elements projecting from a base sheet, with the base sheet and truncation surfaces providing increased bonding areas for external face sheets. Mass produced, identical panels which are nestable for shipping and storage may be combined in an interlocking arrangement to form a combined panel which is nearly isotropic in its reaction to external loads.

10 Claims, 18 Drawing Figures

STRUCTURAL PANEL

This is a continuation-in-part of application Ser. No. 172,674, filed July 28, 1980 (now abandoned) which, in turn, is a continuation of application Ser. No. 045,918 filed Aug. 17, 1979 (now abandoned).

CROSS-REFERENCE TO PRIOR ART

U.S. Pat. No. 3,645,833—Figge, "ARTICLE AND METHOD OF QUASI-ISOTROPIC CORE FILAMENTS"

U.S. Pat. No. 3,642,566—Figge, "QUASI-ISOTROPIC SANDWICH CORE"

U.S. Pat. No. 3,657,059—Figge, "QUASI-ISOTROPIC SANDWICH CORE"

U.S. Pat. No. 3,689,345—Figge, et al.-"METHOD OF MAKING A QUASI-ISOTROPIC SANDWICH CORE"

BACKGROUND OF THE INVENTION

The present invention is directed to a low weight, high strength, three-dimensional space structure with nearly isotropic load-bearing characteristic for reacting fully to tensive and compressive external loads. The structure provides high bending stiffness and a high degree of torsional rigidity and may be self-sufficient or used as a core material.

The closest prior art of which applicant is aware are the above cross-referenced patents which disclose the apparatus and method for making a structural core comprising a symmetrical arrangement of generally tetrahedronal shaped internal supports for such articles of manufacture as air foils. The disclosures of these patents are herein incorporated by reference.

A more detailed description of the prior art is presented in AIAA Paper No. 74-357, based on AIAA/ASME/SAE 15th Structures, Structural Dynamics and Materials Conference, Las Vegas, Nevada/Apr. 17–19, 1974. This publication indicates that a winding process used to produce the tetrahedra elements may be halted at any point to produce either "truncated" tetrahedra or a repeated series of stacked tetrahedral elements. However, no properties or uses for "truncated" tetrahedra are stated or suggested.

It is also known to provide honeycomb-core panel structures having a pair of face sheets with the honeycomb sandwiched therebetween. These honeycomb structures provide very good tensive and compressive characteristics for distributed loads which are normal to the face sheets. However, these conventional honeycomb structures are not capable of reacting fully to forces of tension and compression which are generally parallel to the face sheets; instead, they tend to buckle or delaminate accordingly. Additionally, the core of these honeycomb structures provide only line contact for bonding of face sheets.

The instant invention provides a structural panel having plural, truncated-apex elements of various geometries protruding in one direction from a base sheet, such that the base sheet and the truncation planes of the elements provide excellent bonding areas for the addition of external face sheets by adhesives, welding, and the like. Alternatively, according to the material used in the fabrication of the panel, face sheets or the like may be attached by nails, rivets, screws, or other conventional attachment means. Two of the novel panels may be combined such that the elements of one panel are caused to interlock with those of the other panel in order to provide added internal load bearing or reacting capabilities; or, the two panels could be arranged, base sheet-to-base sheet, to present only the truncation plane surfaces for face sheet bonding. Another embodiment includes elements projecting in opposite directions from one base sheet. Still further, the combined panel arrangements could be formed in one piece.

The instant invention may have, but does not require, additional external face sheets to react to external loads. However, when face sheets are desired, large surfaces are provided by the base sheets and/or truncated-apex surfaces for ease and strength of bonding, as well as increased torsional rigidity.

Geomtries of the truncated elements may include cones and generally polyhedral-structures, with altered regular tetrahedrons (having the apexes and intersecting faces truncated) being preferred. The truncated intersecting faces are referred to herein as "quasi-faces" and act as particularly good load reacting beams when two panels are combined to form interlocking elements as mentioned above. Further, the elements of a panel may have different base-to-truncated apex heights to provide large and small elements and may be arranged on the panel so that, when two panels are combined, the large elements of opposite panels interlock with adjoining quasi-faces and the truncated apexes of the small elements of opposite panels abut to provide good surface areas for attachment of the two panels.

The element structure of the novel panel is capable of accepting local loads and distributing them throughout the rest of the panel, since the structural material is distributed precisely along the lines of maximum stress density. This provides for a nearly isotropic structure capable of fully reacting to external loads.

For storage and shipping purposes, mass produced panels may be nested, with the elements of each panel fitting into like elements of an adjacent panel.

The panels may be manufactured from any formable or moldable materials including plastics, fiber glass, concrete, cement, reclaimed and recycled materials (uses as structural or non-structural aggregates) or any combination of these materials. The materials may range in hardness from resinated paper to titanium. For instance, waste pulps and fibers and reclaimed low-grade aluminum and steels are excellent materials for manufacture of the panels. By utilizing foam (in an open or closed form of the panel) or evacuating individual closed elements to produce a thermos effect, excellent insulating properties may be incorporated in the panels.

Uses for these structural panels range from pellets, to building panels (including economical load bearing walls), to aircraft wing ribs and helicopter drive shafts, to aerospace applications. Automobile bodies, portable bridges, boat hulls, and packages (such as shipping boxes) are articles of manufacture to which this technology may be adapted also.

The aesthetics of the panels may be enhanced by exposing apertures or hollow portions, by applying various colored or variegated external face sheets, and by curvilinear shaping of the panels. To meet varying design requirements, the geometric proportions and material selection of the elements may be varied for different core stiffnesses and strengths. For instance, by varying the relative sizes of the polyhedral-shaped elements, the panels may be given complex curvatures.

Techniques of manufacture such as conventional die forming and molding and casting may be used, depending on the material used.

DETAILED DESCRIPTION OF THE INVENTION

Figure 1:
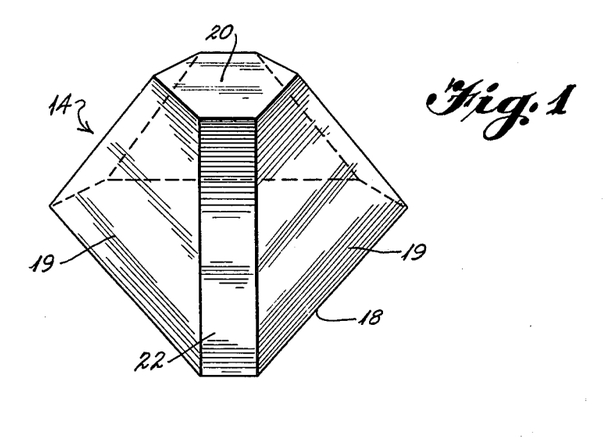
FIGS. 1-3 and 15 are isometric views of elements that may be used in the invention.
Figure 2:
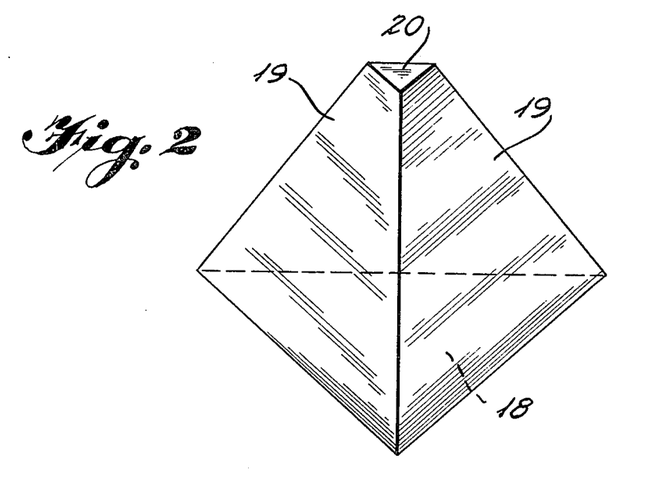
Figure 3:
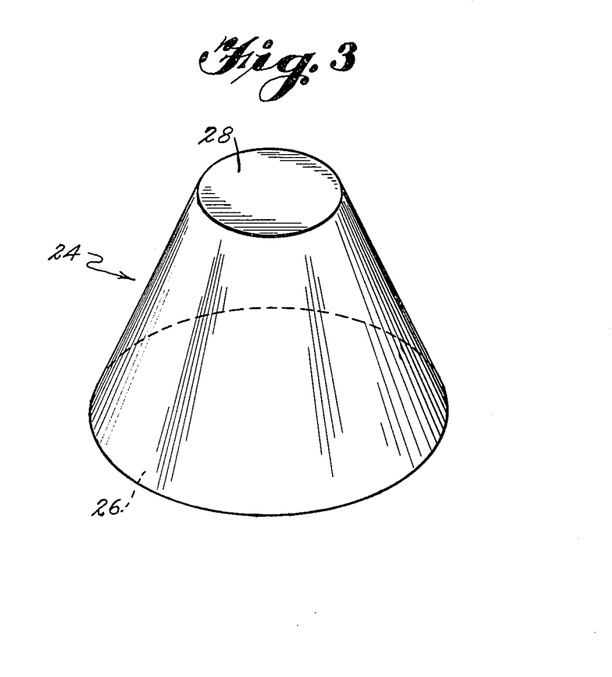

FIGS. 1-3 illustrate various shaped elements which may be incorporated into the structure of the instant invention. The element 14 of FIG. 1 is an altered, regular tetrahedron having faces as at 19, a base 18 (open or closed), a truncated apex 20, and quasi-faces 22. The element shown in FIG. 2 is much like that of FIG. 1, but has no quasi-faces 22. In FIG. 3, a truncated cone 24 has base 26 (open or closed) and truncated apex 28.

Figure 4:
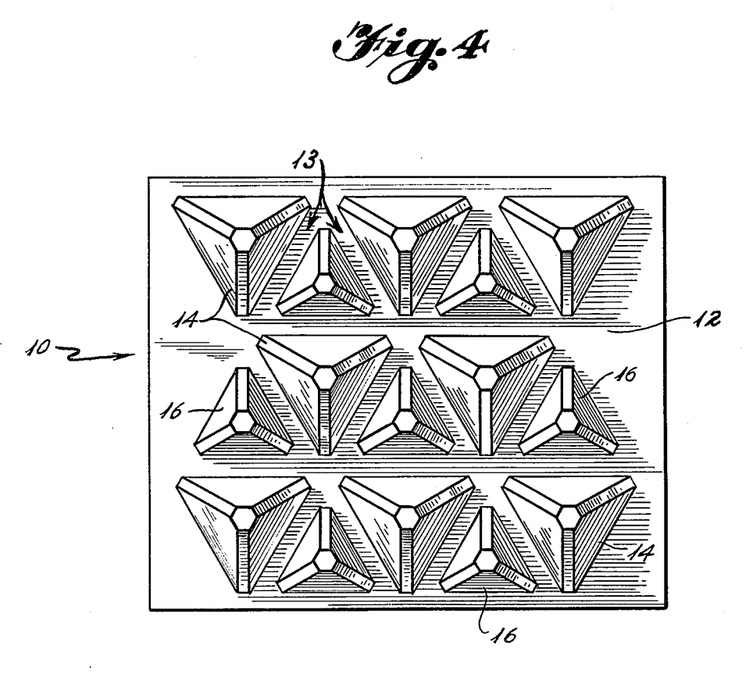
FIGS. 4 and 16 are each a top plan view of a structural panel with truncated tetrahedra projecting upwardly therefrom according to the invention.

Referring to FIG. 4, one embodiment of the invention comprises an individual structural panel 10 having a base sheet 12 with interpersed large truncated tetrahedrons 14 and small truncated tetrahedrons 16 protruding upwardly therefrom, as viewed from the top. Intersecting web portions as at 13 of base sheet 12 provide a matrix that spaces the various protruding tetrahedrons from each other.

Figure 5:
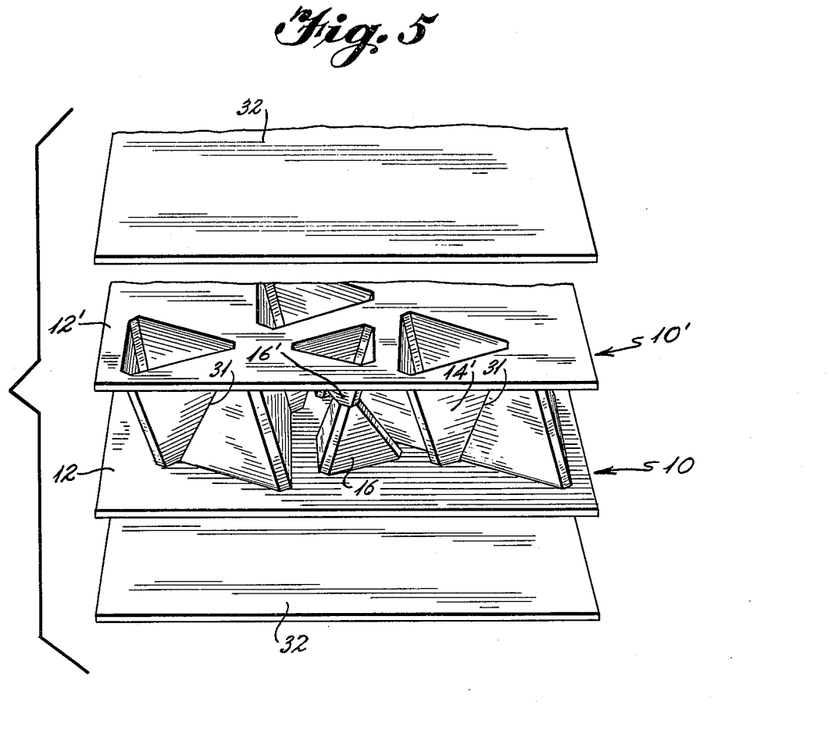
FIGS. 5 and 17 are each a partial, exploded, perspective view of one embodiment of the invention in which two panels are arranged in an interlocking configuration to form a combined panel.

By duplicating panel 10, two panels may be arranged in an "interlocking" configuration to form a combined panel as in FIG. 5, in which the duplicate panel members are indicated with a superscript. For instance, duplicate panel 10' is inverted and placed on top of panel 10 with the truncated apexes of small elements 16' abutting the truncated apexes of small element 16 to provide tension and compression load bearing for forces normal to the base sheets 12, 12'. When not on the outer periphery of the combined panel, each quasi-face 22, 22' of large elements 14, 14' abuts with a quasi-face of a large element of the opposing panel with the edge of the abutment plane indicated at 31 in the drawing, to provide internal load bearing beams. The planes of the truncated apexes of the small elements 16, 16' and of the quasi-faces of large elements 14, 14' provide excellent bonding surfaces. Further, exterior face sheets 32 may be added to the combined panel for added strength and to enhance the appearance of the panel, although it may be desirable and more economical to eliminate face sheets 32 in some applications. When face sheets 32 are used, base sheets 12, 12' provide large bonding surfaces for their attachment. Although not shown, the periphery of the combined panel could also be enclosed by a peripheral facing, formed as an extension of either or both base sheets 12, 12' or applied separately.

In one technique for molding the combined panel of FIG. 5, each half is formed over a mold (not shown) consisting of a series of truncated-apex polyhedrons placed base-to-base, so that a single panel 10 (as in FIG. 4) is formed on each side of the mold. After molding, the upper single panel is inverted and bonded to the lower single panel, such that each polyhedron in the upper half interlocks with the polyhedra of the lower as in FIG. 5. Depending upon the materials and this or other techniques used, the mold or pattern may be open (vacuum forming, etc.) or notched closing (various high and low pressure dies/molds) with the raw material usually in sheet form.

When all of the polyhedral elements are the same size, single piece forming techniques (casting, rotational molding, injection molding) result in a finished structure (without integral exterior face sheets) which has the advantage of being one piece in construction.

Automated, numerically controlled, continuous rolling of the panels represents the greatest opportunity for a major housing cost breakthrough. With this technique, particularly if it can be made reasonably mobile, the entire production cost of the housing industry can be altered downward. Using continuous rolling, a wall core would be formed (and optionally faced) with internal plumbing and wiring automatically cut to plan. Plans could be varied on a sequential basis, as desired, offering variety heretofore both impractical and uneconomic to the builder/developer. Despite the heavy initial investment required for such machinery, continuous rolling will allow home construction at overall costs far below those of any current system. One of the more obvious secondary benefits is the esthetic potential made possible by choice of plan and interior/exterior facing materials, resulting in net cost savings in the basic (core) construction.

Cost effective means production is within the state-of-the-art using standard production tools and machinery. Conventional die forming and/or molding techniques and machinery can be utilized, depending upon the material used. Interior and exterior facings can be applied either directly during the fabrication process or afterwards.

To meet varying design requirements, the geometric proportions and material selection of the constituent elements can be selected to provide varying core stiffness and strengths. Sections having complex curvature can be fabricated by varying the relative sizes of the elements in the upper and lower halves. Structural elements have been formed from a variety of disparate materials ranging from resinated paper to titanium sheet.

An individual panel 10, as in FIG. 4, may have a face sheet (as at 32 in FIG. 5) attached to the top and/or bottom of the panel, with truncated apexes 20 providing excellent bonding surfaces of a top face sheet and base sheet 12 providing an excellent bonding surface for a bottom face sheet. It has been found that the "bending stiffness" of a panel is increased when a face sheet is attached to the truncated apexes 20. Even more "bending stiffness" is provided when a face sheet is attached to base sheet 12 in addition to the one attached to truncated apexes 20.

The novel structure also allows for an "edge interlock" between edgewise adjacent panels. Two or more panels of the type shown in FIG. 4, with the elements 14, 16 of both oriented in the same direction, may be edge interlocked by nesting the elements along the edge of one panel into those of another panel.

Figure 6:
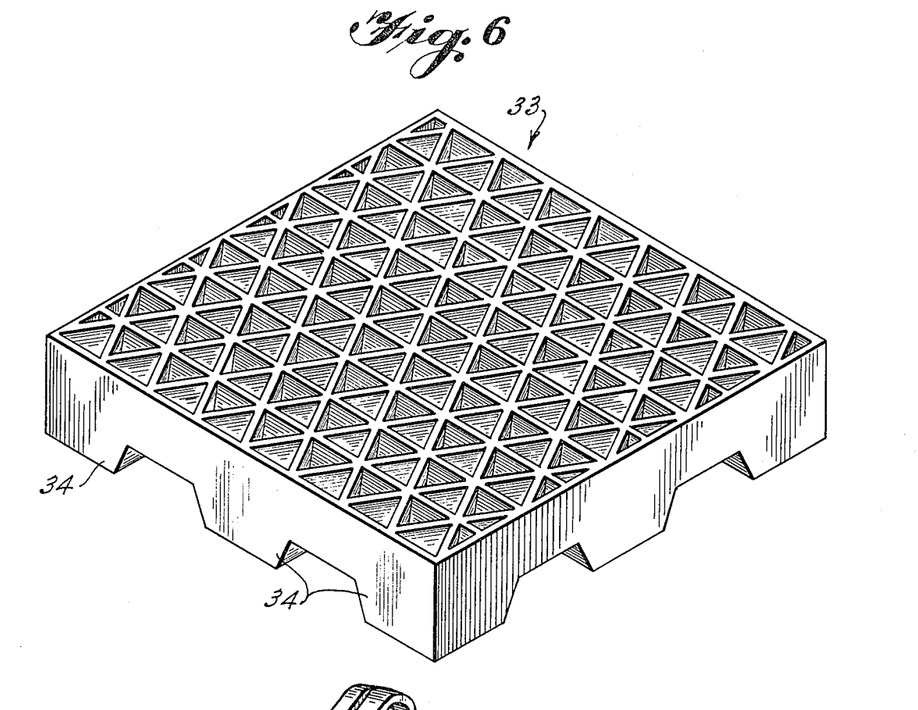
FIG. 6 is an isometric view of a pallet incorporating an alternative embodiment of the invention.

FIG. 6 illustrates a pallet 33 formed from one structural panel and having integral legs 34 spacing it from the floor to allow forklift entry beneath the pallet 33. Depending on the sizes of the elements 35 and the objects to be supported on the pallet 33, a face sheet (as at 32 in FIG. 5) may or may not be necessary for normal pallet use. Alternatively, the legs 34 could be omitted such that the truncated apexes of all or various ones of the elements 35 serve as feet for the pallet 33. Further, two such pallets 33 could be combined, with the elements of each panel pointing toward or away from each other, so that either side could act as the top surface. In this respect, forlift access apertures could also be incorporated if desired. Still further, a base sheet 12 may have elements 14 protruding from both sides to provide a reversible pallet having alternate top surfaces.

Figure 7:
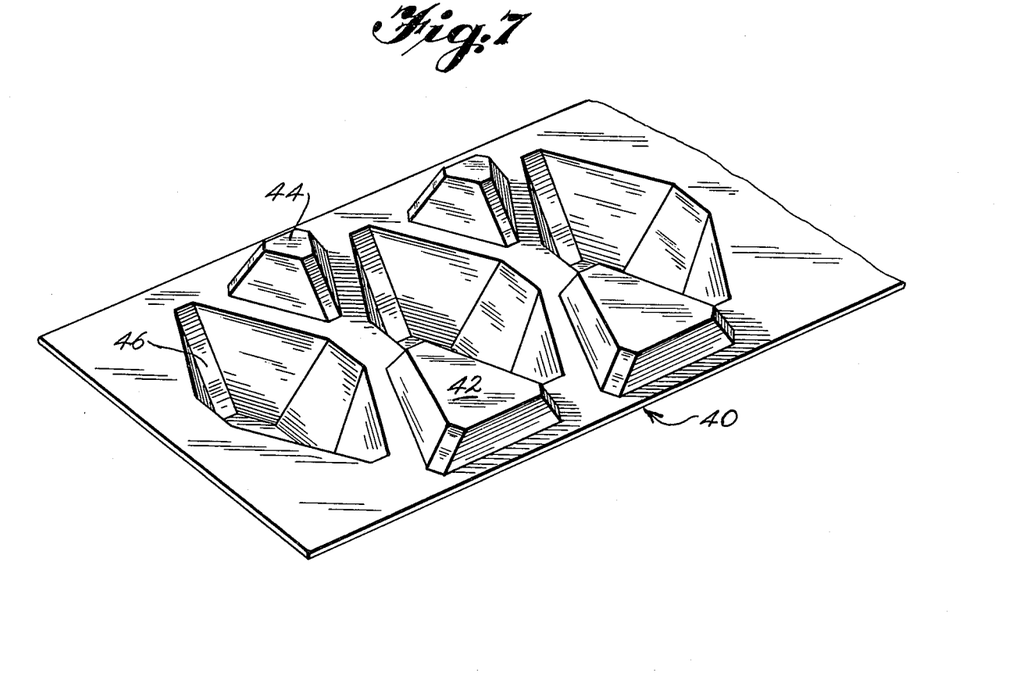
FIG. 7 is a perspective of a leg structure which may be used with the panel of FIG. 4.
Figure 8:
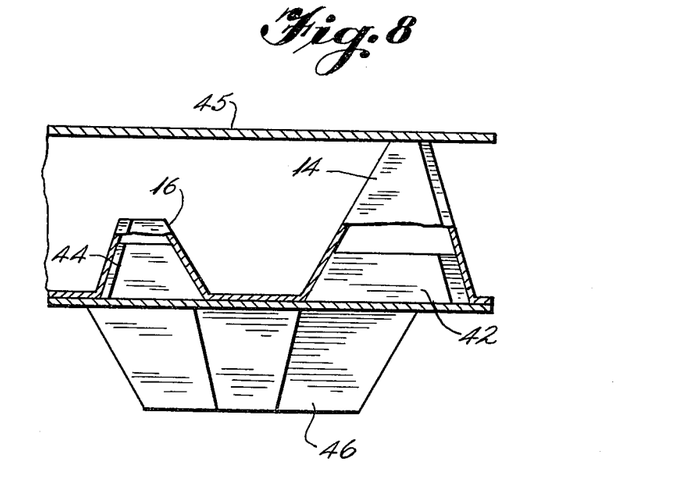
FIG. 8 is a fragmentary side view, illustrating the use of the leg structure of FIG. 7.

FIGS. 7 and 8 illustrate a separate leg structure 40 which is attachable to the combined panel of FIG. 5 to adapt it into a pallet. Insert elements 42 and 44 are adapted to fit into elements 14 and 16, respectively, of the combined panel of FIG. 5, and may be bonded along those surfaces which mate with the interior of elements 14 and 16 or with base sheet 12. Feet 46 serve to space the combined panel from a surface such as a floor.

The pallet of FIG. 6, because of its inherent high strength and cost effectiveness, overcomes all of the drawbacks that have beset the non-wooden pallet industry. Many versions of it can be produced by thermoforming, the least expensive of the forming processes. For comparable strength in plastic form, it does not require high density structural materials but can be fabricated of the less expensive varieties and also include aggregates which may incorporate recycled waste. Because of these economies, it affords great flexibility in design and size and is structurally superior to wooden pallets at a competitive cost for most applications.

Although facing (decking) may be added, as at 45 in FIG. 8, it is unnecessary since the surface indentations (as at 35 of FIG. 6) may be made small enough to support articles without the articles "dropping" into indentations. Access by forklift may be provided on two or four sides. An alternate structure for the pallet may have an open lattice construction, to permit flow-through of steam and detergents when cleaning, for use in the food industry.

The pallet configuration represents the highest strength for comparable low weight in the non-wooden pallet field. For example, one 15 pound closed face experimental unit of high impact polystyrene was loaded with two tons of bag cement with no failure from either a static or dynamic load carrying or a handling standpoint. For ultimate light weight and high strength in the closed face design, a structural interior matrix of elements with foam in all interstices and a thin wall formed face sheet can be used. For most applications, however, the pallet of FIG. 6 offers ample load carrying ability, ease and flexibility of handling, owner identifiability, as well as initial low cost and the capability for automated manufacture.

Pallets incorporating the instant invention are the first economic alternative to the standard wooden pallet from a strength, load-carrying and durability standpoint, with the particular advantage that they can be formed from a wide spectrum of materials and aggregates, including reclaimed and recycled materials (i.e., waste pulps, fibers, reclaimed low-grade aluminum and steels, etc.). In many cases so-called "waste" materials can be introduced which will increase strengths, enhance certain secondary properties of the base material, or reduce overall costs without degrading strength or sacrificing quality. Also, aggregates or fillers can be varied according to raw material supply conditions offering flexibility against fluctuating market prices in basic raw materials as well as fillers.

A prototype of the combined panel of FIG. 5 was constructed of molded, high impact polystyrene. Each panel had truncated regular tetrahedrons as elements, with alternate elements being of two different sizes. Each large element had a base-to-truncated apex height of 2", a quasi-face width of 5/16", truncated apex plane surface dimension of $\frac{7}{8}$" (from quasi-face to opposite face), and a base dimension of approximately 3" (from quasi-face to opposite face) in the plane of the base sheet. In comparison, each small element had the same truncated apex plane surface and quasi-face width dimension, one-half the base-to-truncated apex height, and a base dimension of approximately 2" (from quasi-face to opposite face) in the plane of the base sheet. Conventional screws were used to attach the panels together, although adhesive bonding is preferred. This structure is particularly useful as a pallet in which either side of the pallet may be used as the loaded surface.

Figure 9:
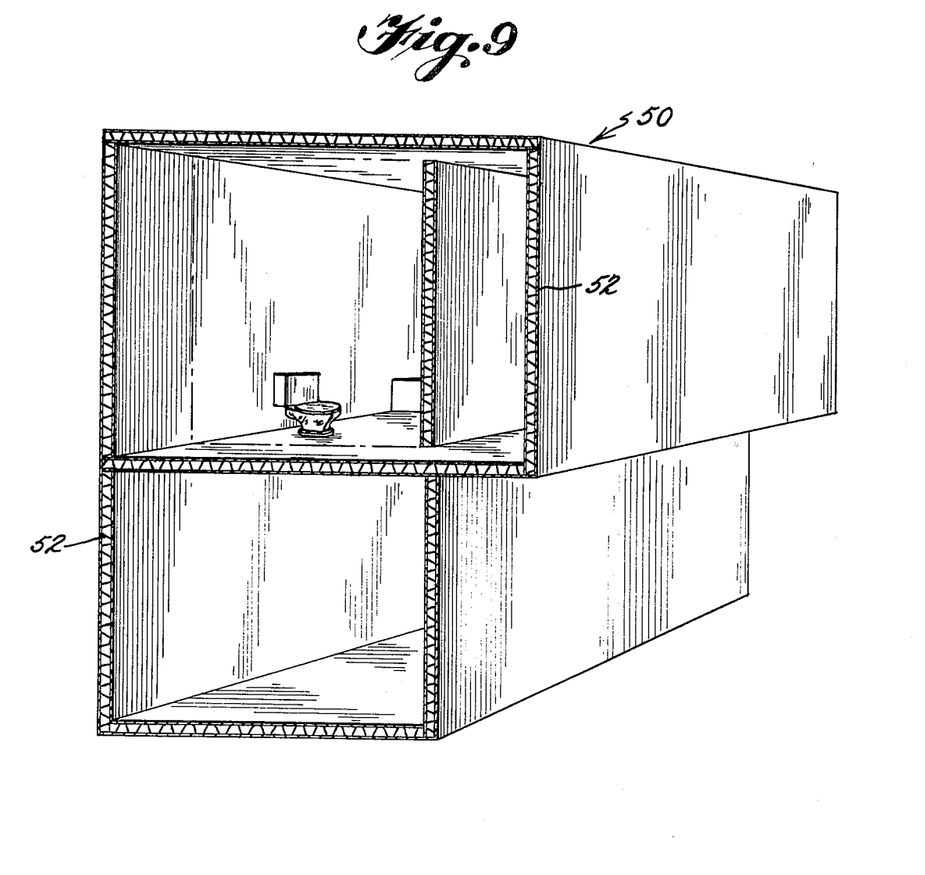
FIGS. 9-12 illustrate various articles of manufacture which incorporate the invention therein.

The instant invention also is adaptable particularly to the production of economical load bearing walls. FIG. 9 illustrates the use of combined panels for walls, floors, and ceilings of a fixed site or mobile home 50. A cross-section of a wall 52 would reveal the structure of FIG. 5. As the combined panel is a three-dimensional space structure, it offers nearly isotropic, in-plane load carrying capabilities, great bending stiffness, and a high degree of torsional rigidity. These load bearing characteristics apply equally to floors and roofs and are variable according to material, wall thickness, and base-to-truncated apex height. For example, with all other factors constant, stiffness/rigidity increases exponentially with base-to-truncated apex height. Additional reinforcement of apertures, such as doors and windows, is obviated in all but the largest combined panel sizes due to the internal load bearing of the structure. Combined panels (as in FIG. 5), responding to working by normal hand tools, are capable of being used in a studless building system.

The invention offers load bearing capabilities far in excess of comparably priced home building structures, a factor that opens the door to substantial savings in material costs. Due to each polyhedral section's ability to accept and distribute a given local load more evenly throughout the entire structural network, tradeoffs in materials for a given load capacity may be accomplished. For example, floor elements equal in weight to joist type construction would be approximately three times stiffer, or, conversely, lighter by a factor of three for the same capacity. Obviously, materials optimization can lead to substantial economies without adversely affecting strength.

Composites of low heat and pressure formables that are produced from mill wastes (varying from pine needles to ground chips) can be used also to manufacture the structural panels. These panels are particularly attractive as they are variable in density and thus can be tailored to specific applications with a density range of 5-90+lbs./cu.ft. and do not require significant amounts of energy compared to competitive products.

The need to house all of America adequately is one of the major national priorities. Thus far, achievement of this goal has been largely unsuccessful by using variations of thoroughly familiar conventional building technologies. Pre-cut, pre-assembled, and "on site" mass produced approaches have demonstrated that substantial economies of scale may be obtained within the state-of-the-art.

With the instant invention, s simple, low-cost, multivariable structural building system is made available which offers potential across-the-board savings. The high strength configuration of the invention makes it possible to erect low (man/material) cost buildings in all common shapes and forms. Economies may be realized by a panel, sectional, or total structure utilization to the invention. Materials selection flexibility permits panels to be either clear or opaque to solar heating, a factor that offers further design opportunity in an energy conscious era. The inherent strength of design is particularly attractive as it allows use of materials that are non-critical in cost or composition, and which are limited, as raw materials, only to those forming techniques to which they respond.

For conventional housing applications, standard 4×8 panels offer both design and cost benefits. By replacing more familiar building materials and methods with the inventive structure, tools and techniques do not vary substantially, if at all, from those now used by the industry. Edge locking (wall-to-wall mechanical interlocking) also offers rapid on-site erection with the added benefit that crew size can be reduced by elimination of certain non-skilled personnel.

Cost effective mass production of building structures using the instant invention for the housing industry market is well within the state-of-the-art. Virtually any formable or moldable material can be utilized as well as all conventional machinery and production techniques. Precision fabrication, fewer assembly operations, and reduced manpower requirements on site further reduces total costs, thus stemming what has heretofore been an irreversible tide of rising housing prices.

The novel panel structure can also be formed or used for skins, bulkheads, spars, rotor blades, hubs, linkage, etc. of aircraft. Since high strength coupled with low weight is the critical factor associated with aircraft design and aircraft payloads, the novel structure of the invention will have considerable application in many aircraft categories since it can be and has been formed in materials up to and including titanium. Even here, it is often a case of engineering down to a given strength requirement, rather than one of weight.

In certain applications, airframes are subject to in-flight damage such as that caused by projectile impact. Military aircraft operating in a hostile environment represent such an application, as do commercial aircraft damaged by iceballs or other foreign objects, and space vehicles subjected to meteroid impact. In each of these cases, a flaw or hole is introduced into the structure causing some degree of reduction in structural capability. There is data available showing that relatively small holes (one-half inch and smaller) can cause reductions of 40 percent and greater in the residual tensile strength of prior art panels. A primary objective of the invention, of course, is to improve damage tolerance without sacrificing structural benefits.

Figure 10:
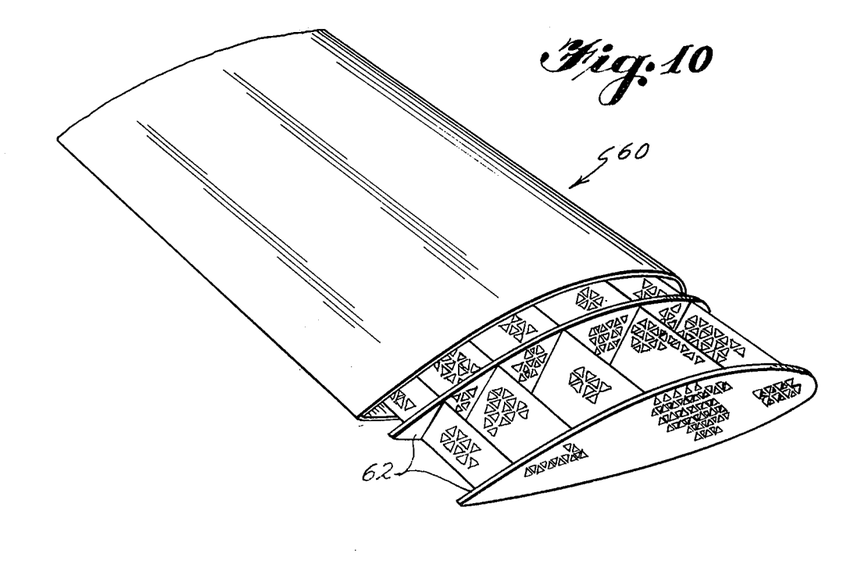
Figure 11:
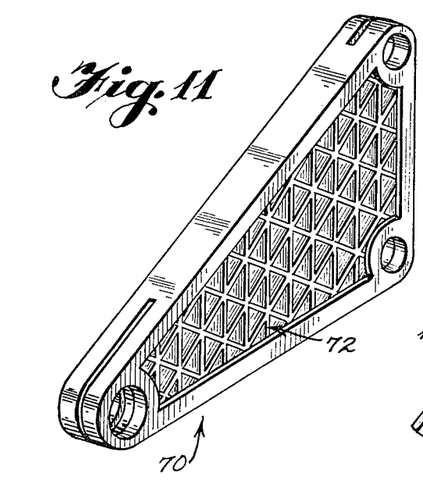

FIG. 10 illustrates one use of the novel panel in an aircraft wing 60 having various portions such as spaced struts 62 formed from the novel panel. A variety of strut configurations can be utilized as required for specific load carrying applications. A cross-section of strut 62 would reveal the combined panel of FIG. 5, without the exterior face sheets 32. FIG. 7 illustrates the construction of an impact-damage tolerant forward bellcrank 70 for a helicopter, the bellcrank having the combined panel 72 incorporated therein weighed only 2.0 lbs. as compared to 3.4 lbs. for the existing magnesium bellcrank.

Figure 12:
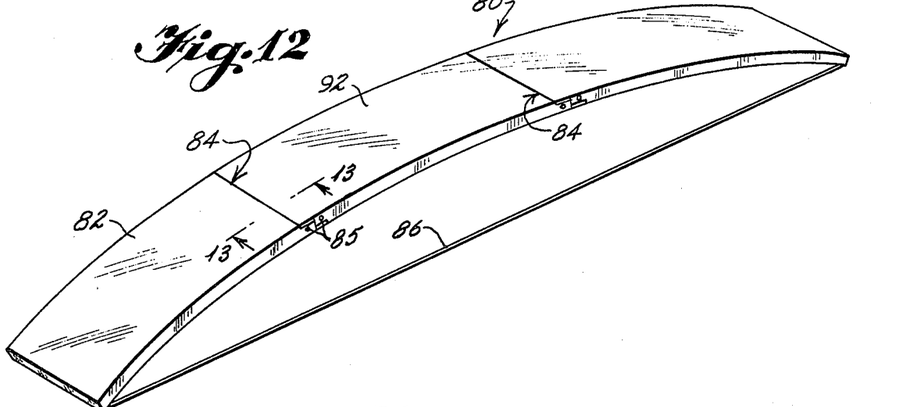
Figure 13:
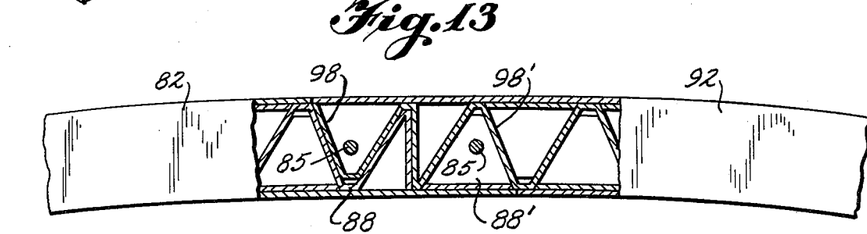
FIG. 13 is a sectional view taken along lines 13—13 of FIG. 12.
Figure 14:
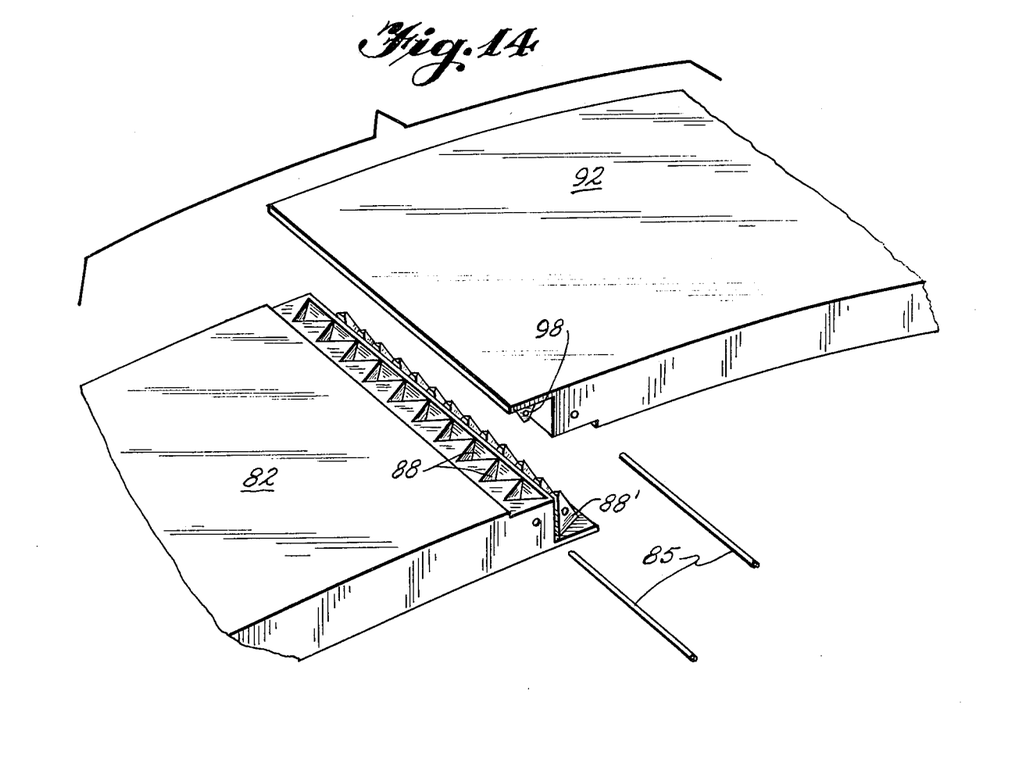
FIG. 14 is a fragmentary, exploded isometric of the interlock of FIGS. 12 and 13.

FIG. 12 illustrates the use of a curved combined panel, according to the invention, in which several panels 82, 92 are "edge interlocked" at 84 to form a self-supporting roof or portable bridge 80; an additional tensioning cable may be used, as at 86. FIGS. 13 and 14, respectively, illustrate the edge interlocking 84 connected and exploded. Top elements 98 of panel 92 nest in top elements 88 of panel 82 and bottom elements 88' of panel 82 nest in bottom elements 98' of panel 92. Lock rods 85 may also be inserted through the nested elements, as shown.

The basic generally polyhedral elements may take various forms and provide various means of interlocking. For instance, FIG. 15 discloses an alternate embodiment in which structural element 100 comprises faces 102 (creased at 103), truncated apex 104, base (open or closed) 106, and a stepped interlock along the edges of intersection of faces 102. The interlock is stepped at 110 with the upper portion having internal corner 112 and the lower portion having external corner 114. FIG. 16 discloses an individual panel 118 comprising a base sheet 116 with plural elements 110 protruding upwardly therefrom. FIG. 17 discloses a combined panel similar to that of FIG. 5 and incorporating the alternate element of FIG. 15. As can be seen from this drawing, top panel 118' is an inverted duplicate of panel 118, with external corner 114' mating into internal corner 112 and external corner 114 mating into internal corner 112'. The step 110 enhances the reaction to compressive forces and provides another surface for bonding.

Figure 15:
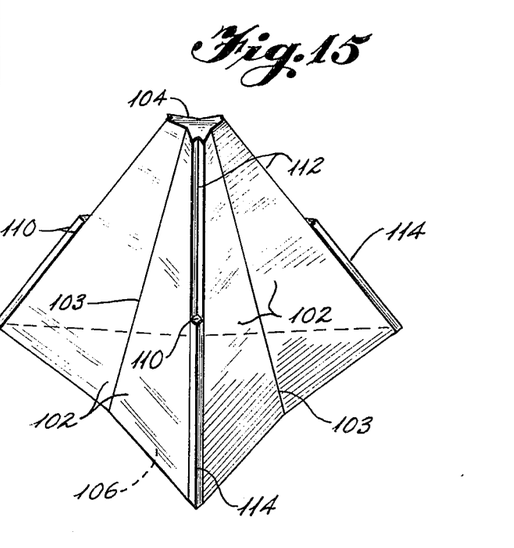
Figure 16:
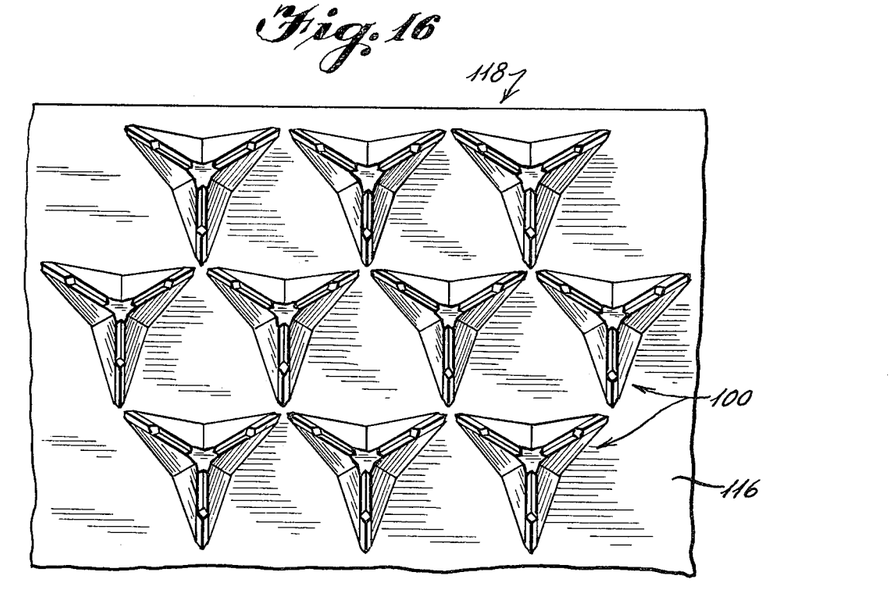
Figure 17:
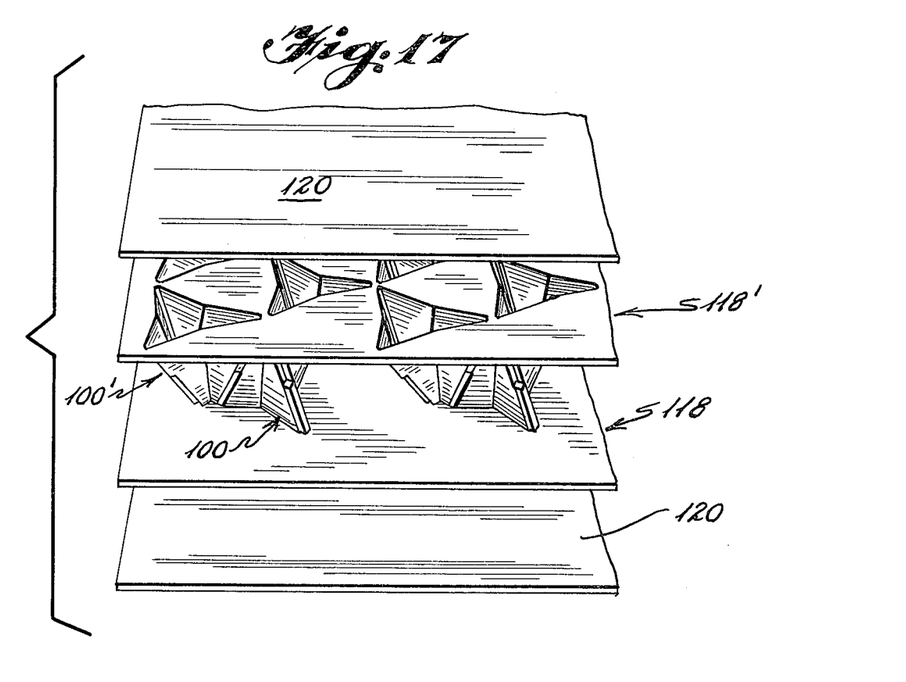
Figure 18:
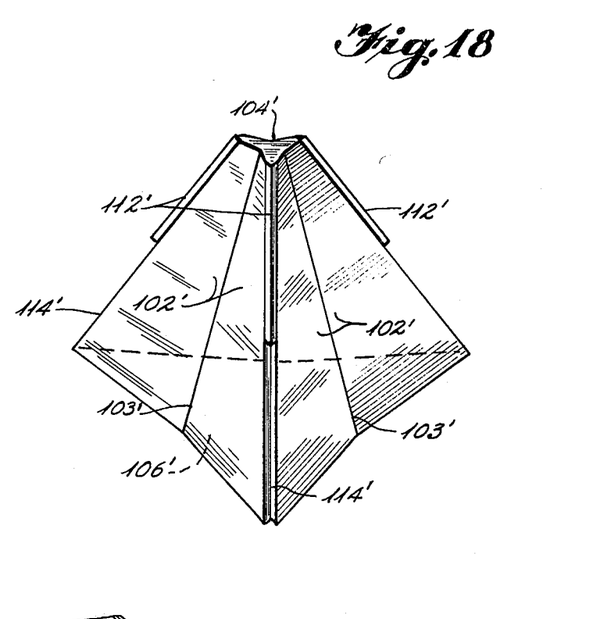

The elements 100 of FIGS. 15-17 could be altered as in FIG. 18 so that corners 112 would extend outward and corners 114 could extend inward. With this altered structure of FIG. 18 used in the combined panel of FIG. 17, vertical interlocking (in addition to the lateral interlocking shown in FIG. 17) would be provided when the top and bottom (preferably slightly flexible) panels are combined.

In alternate embodiments of the various panels, various combinations of the elements depicted in FIGS. 1, 2, 3 and 15 (as well as other regular and irregular truncated-apex polyhedrons) could be used in the panels. Additionally, all of the elements of a panel may have the same base-to-truncated apex height. For instance, with the heights of all of the elements being the same, the combined panel of FIG. 5 could have all of the elements abutting, like small elements 16, 16', or could have all of the elements interlocking, like large elements 14, 14'.

Since the novel structure exhibits high strength, low weight, easy formability, and low cost (depending upon material) in a wide variety of applications, there are many industries where these qualities will prove both desirable and necessary. For instance, the novel panel may be used in automobile doors and roofs to meet side-impact and roll-over specifications, where it offers high resistance to impact, with concurrent reduction in weight and economies in fabrication and production. Bumpers would be energy absorbing and, due to the economy of manufacture, easily replaceable. Since the novel structural panel can be formed with either simple or compound curves, styling factors are not inhibited as they are when certain other reinforcing techniques are used. Finally, the weight, though not as critical as in aircraft, is still most significant in the cost of automobiles and associated systems (i.e., savings in weight permit across-the-board reduction in vehicle cost). The packaging industry rivals the automotive in sheer size and gross dollars per year. Here the inexpensive fabrication qualities of the panel, allied with its high strength per panel, should supplant conventional cardboard in many applications.

While only a few industries have been mentioned above, there are many more such as boat building, mobile homes, recreational vehicles, furniture, etc., where the novel panel structure can have primary and significant application.

It is to be understood that the present invention is not limited to the preferred embodiments disclosed herein, and that many modifications in construction, arrangement, use and operation are possible within the true spirit of the invention. The present invention is accordingly to be considered as including all such modifications and variations coming within the scope of the appended claims.

What is claimed is:

1. A combined structural panel comprising:
   at least two, substantially duplicate, single structural panels, each of said single structural panels comprising a base sheet, plural generally polyhedral-shaped load bearing elements protruding from said base sheet;
   each of said elements comprising a base attached to said base sheet, a truncated apex, and face structure connecting said base and said truncated apex;
   at least one of said single panels inverted with respect to at least one other of said single panels to define respective, opposing top and bottom panels, respectively, such that the elements of said top and bottom panels have their respective elements protruding in opposite directions;
   said elements of each single panel further comprising large and small elements, said large elements having a base-to-truncated apex height greater than that of said small elements, said large and small elements of each of said top and bottom panels alternately arranged such that truncated apexes of said small elements of opposing single panels abut and truncated apexes of said large elements of a single panel abut the base of the opposing single panel.

2. A combined structural panel as in claim 1, wherein each of said elements is generally tetrahedronal-shaped.

3. A combined structural panel as in claim 1, wherein said face structure comprises:
   truncated, generally planar surface, face intersections defining quasi-faces and wherein at least one of said large element quasi-faces of said top panel abut at least one of said large element quasi-faces of said bottom panel to provide interlocking and internal load bearing support for said combined structural panel in directions generally parallel to said bases.

4. A combined structural panel as in claim 3, wherein each of said elements is generally tetrahedronal-shaped.

5. A combined strutural panel as in claim 1, wherein said face structure comprises:
   altered intersections of faces of said elements, each of said altered intersections being stepped to provide corners protruding inwardly of said elements and corners protruding outwardly of said elements such that said inwardly and outwardly protruding corners are mated to provide interlocking of said structural panels at least in a direction generally parallel to said bases.

6. A combined structural panel as in claim 5, wherein each of said elements is generally tetrahedronal-shaped.

7. A combined structural panel as in claim 1, and further comprising a first face sheet attached to at least one side of said combined panel.

8. A combined structural panel as in claim 7, and further comprising a second face sheet attached to the other side of said combined panel.

9. A combined structural panel as in claim 8, and further comprising a third face sheet enclosing the periphery of said panel.

10. A combined structural panel as in claim 1, wherein said face structure of each large element comprises at least three faces, said large elements of each single panel having equal dimensions and arranged in longitudinal rows, each row of said large elements being in offset sequential relation to the large elements in an adjacent row, such that two sides of all large elements are disposed in oppositely inclining, parallel planes and the remaining sides of all of said large elements are disposed in parallel longitudinal planes, such that any three of said planes intersecting encloses said large elements above said base sheet with each of said intersecting planes containing a face of each large element, whereby three-axis stability is provided for said combined structural panel.

* * * * *